United States Patent
Coast et al.

(10) Patent No.: US 6,234,260 B1
(45) Date of Patent: *May 22, 2001

(54) MOBILE DRILLING APPARATUS

(75) Inventors: John B. Coast; Waino J. Kangas, both of Baton Rouge, LA (US)

(73) Assignee: Coast Machinery, Inc., Baton Rouge, LA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/151,043

(22) Filed: Sep. 10, 1998

Related U.S. Application Data

(63) Continuation-in-part of application No. 08/820,121, filed on Mar. 19, 1997, now Pat. No. 5,811,741.

(51) Int. Cl.$^7$ .................................................. E21B 3/02
(52) U.S. Cl. ............................ 175/113; 175/19; 175/162; 175/171; 405/199; 405/232; 173/148; 173/184
(58) Field of Search ........................................ 405/232, 244, 405/259.1, 231, 199, 258; 175/171, 162, 19, 113, 55; 299/17; 173/1, 24, 26, 28, 49, 148, 149, 184, 193

(56) References Cited

U.S. PATENT DOCUMENTS

| | | | |
|---|---|---|---|
| 701,547 | * 6/1902 | Davis | 175/171 |
| 1,931,845 | * 10/1933 | Hart et al. | 405/248 X |
| 3,107,738 | * 10/1963 | Osborn | 173/1 |
| 3,148,739 | * 9/1964 | Mattingly et al. | 405/232 X |
| 3,356,163 | * 12/1967 | Rowe et al. | 405/232 X |
| 3,519,088 | * 7/1970 | Bayless | 173/149 |
| 3,777,827 | 12/1973 | Thiery et al. | 175/103 |
| 3,869,003 | * 3/1975 | Yamada et al. | 175/171 |
| 3,872,932 | 3/1975 | Gosselin | 173/1 |
| 4,164,082 | * 8/1979 | Watson | 405/259.1 X |
| 4,195,698 | * 4/1980 | Nakagawasai | 175/171 |
| 4,249,836 | * 2/1981 | Schmednecht | 405/248 X |
| 4,492,274 | 1/1985 | Schosek | 175/19 |
| 4,499,698 | * 2/1985 | Hoyt et al. | 405/258 X |
| 4,603,748 | 8/1986 | Rossfelder et al. | 175/19 |
| 4,637,758 | * 1/1987 | Tamaki et al. | 405/248 |
| 4,718,048 | 1/1988 | Staron et al. | 367/40 |
| 4,819,740 | 4/1989 | Warrington | 173/49 |
| 5,040,926 | 8/1991 | Andreasson | 405/232 |
| 5,174,388 | * 12/1992 | Williams et al. | 405/232 X |
| 5,213,449 | * 5/1993 | Morris | 405/232 |
| 5,281,775 | * 1/1994 | Gremillion | 175/19 X |
| 5,355,964 | 10/1994 | White | 173/1 |
| 5,439,326 | * 8/1995 | Goughnour et al. | 405/232 X |
| 5,549,168 | * 8/1996 | Sadler et al. | 405/232 X |
| 5,584,603 | * 12/1996 | Cortlever | 405/232 X |
| 5,733,068 | * 3/1998 | Reinert | 405/232 |
| 5,791,820 | * 8/1998 | Rempel | 405/231 X |
| 5,811,741 | * 9/1998 | Coast et al. | 175/19 X |
| 6,039,508 | * 3/2000 | White | 405/232 |

FOREIGN PATENT DOCUMENTS

405059725 * 3/1993 (JP) ........................................ 405/232

* cited by examiner

*Primary Examiner*—David Bagnell
*Assistant Examiner*—Jong-Suk Lee
(74) *Attorney, Agent, or Firm*—Garvey, Smith, Nehrbass & Doody, LLC

(57) ABSTRACT

An apparatus for drilling boreholes into the earth includes a mobile carrier with a frame that supports an elongated housing. The housing has upper and lower end portions. An drill pipe section holder is positioned at the lower end of a tubular member rotatably mounted in the housing for holding a drill pipe section and rotating it during placement. A plurality of drive wheels carried by the frame transport the housing between upper and lower positions. The wheels are loaded with adjustable compression springs so that extensive pressure can be applied from the drive wheels to the housing for gripping and driving the housing during insertion. A gear train interconnects the driving wheels so that all of the driving wheels rotate at the same rotational speed. Water is supplied to the housing via a bore that communicates with openings and a bore of the tubular member. The tubular member bore conveys the water to multiple sections of drill pipe (i.e. a drill string) connected end-to-end and to a drill bit at the lower end of the drill string.

21 Claims, 7 Drawing Sheets

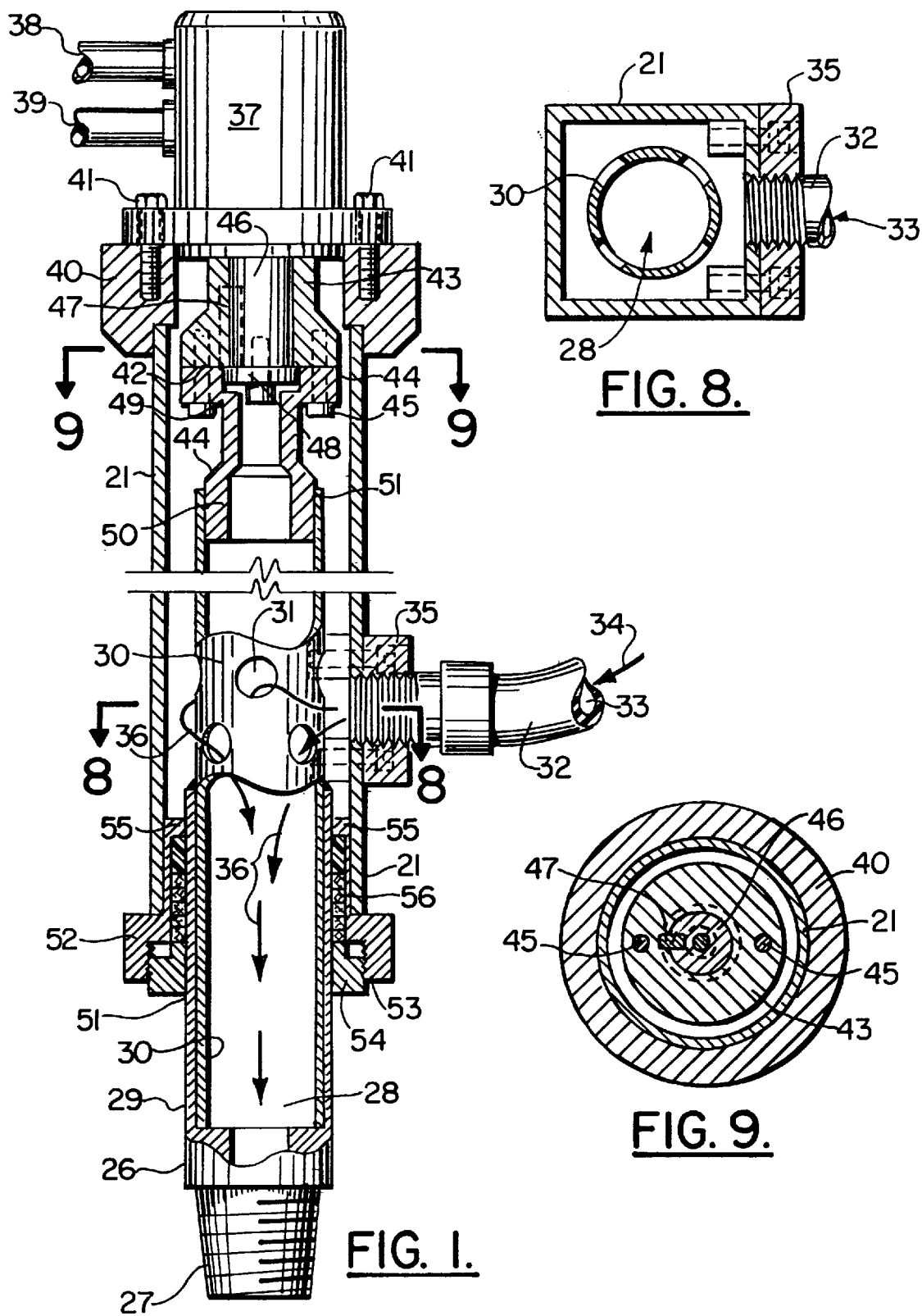

MOBILE DRILLING APPARATUS

CROSS-REFERENCE TO RELATED APPLICATIONS

This is a continuation-in-part of U.S. patent application Ser. No. 08/820,121, filed Mar. 19, 1997, now U.S. Pat. No. 5,811,741 which is incorporated herein by reference.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to a mobile carrier having a drill apparatus thereon for forming boreholes into the earth and using a supply of water that flows through conduits provided on the drill apparatus and through a bore of the drill apparatus to a drill string and drill bit. Even more particularly, the present invention relates to a method and apparatus for drilling boreholes into the earth's surface using a drive that both rotates and simultaneously pushes axially multiple sections of drill pipe that are connected end-to-end (i.e. a drill string) during drilling operations. The drive uses a series of gear driving drive rollers that each shaped to grip the outer surface of a square tubing portion of the housing. A tubular member provides a rotary drive with a connection for forming a connection to the drill pipe sections (drill string). A frame supports the gears and drive rollers. Wipers can be provided for removing dirt mud from the apparatus during an operation.

2. General Background of the Invention

During seismic exploration, it is often necessary to form boreholes into the earth for placing dynamite, geophones, or other objects.

Some patents have issued that relate generally to a drilling apparatus, underground pipe or cable installation, vibratory earth boring systems, vibratory hammer/extractor devices, and methods of installing piling.

The Thiery et al. U.S. Pat. No. 3,777,827 discloses an apparatus for drilling a bore hole with a drill tool driven in rotation by a motor suspended from the end of a drill column constituted by a flexible drill pipe.

The Gosselin U.S. Pat. No. 3,872,932 discloses a process that comprises progressively increasing the weight on the drill bit, determining the greatest value of the penetration rate of the drill bit during this period, progressively decreasing the weight on the drill bit when the penetration rate has reached a determined value and again progressively increasing the weight on the drill bit when the tension on the drill pipe has reached a fixed value. The passage from a period during which this weight decreased and vice-versa is achieved by varying the linear speed of the drill pipe at the ground surface, whereby the tension on the drill pipe is varied.

The Schosek U.S. Pat. No. 4,492,274 relates to a light weight underground pipe or cable installing device adapted to be used in a narrow and deep operating trench. The Rossfelder et al. U.S. Pat. No. 4,603,748 discloses a vibrator system and a method for using a vibrator system to sink pipes or shape equipment. The prior art discussion contained in the '748 patent cites numerous patents and publications that relate in general to earth drilling, the sinking of piles, and pile driving.

The Staron et al. U.S. Pat. No. 4,718,048 discloses a method of locating on drill pipe and ground recordings elementary corresponding to one in the same depth level of the drilling tool, and grouping these elementary recordings in pairs, and then in intercorrelating said recordings of the pairs so as to produce in respect of each pair a correlated signal which is representative of the acoustic energy produced and of the difference in travel times of the waves received on sensors from which the pair of recordings have been obtained.

A vibratory hammer and extractor apparatus is disclosed in the Warrington U.S. Pat. No. 4,819,740.

The Andreasson U.S. Pat. No. 5,040,926 relates to a pile which is intended to take compressive as well as tensile loads or to serve as a reinforcement member in soils. A pile is driven from a roller shaping unit by means of pressure in arbitrary directions into a mass of an earth layer. Upon attainment of the desired depth of penetration and/or pile length the pile is severed at or close to the upper surface of the earth layer.

A pile driving and/or pulling vibratory assembly with counter weights is disclosed in U.S. Pat. No. 5,355,964 issued to John White.

BRIEF SUMMARY OF THE INVENTION

The present invention provides a mobile drilling apparatus for forming boreholes into the earth with a mobile carrier having a chassis and a machine frame.

An elongated housing having a longitudinal bore is supported upon the frame between generally horizontal (stored) and generally vertical (drilling) positions.

An elongated drill pipe member or tubular member is carried within the housing bore and dimensioned to reach near or into the earth's surface during operation. The drill pipe member has upper and lower end portions, a pipe bore and an upper end with pipe openings.

A detachable connection is provided at the lower end of the pipe member.

A drive includes a plurality of wheels that are carried by the frame for transporting the housing between the upper and lower positions, including at least some wheels that frictionally grip the housing outer surface.

A gear train interconnects and drives some of the wheels so that multiple of the wheels rotate at the same rotational speed.

A pusher applies lateral pressure to at least one of the wheels.

A water supply conduit transmits water into the housing and pipe member at the pipe openings, through the pipe bore and through a supported plurality of drill pipe sections (drill string).

There are preferably a plurality of opposed rollers on opposite sides of the elongated housing.

Some of the drive rollers have angular grooves that conform generally to the outer surface of the elongated housing.

The gear train includes a drive gear, an upper gear and lower gear.

The gear train can also include a middle gear driving by a motor drive and wherein the middle gear drives both the upper and the lower gears.

BRIEF DESCRIPTION OF THE SEVERAL VIEW OF THE DRAWINGS

For a further understanding of the nature and objects of the present invention, reference should be had to the following detailed description, taken in conjunction with the accompanying drawings, in which like parts are given like reference numerals, and wherein:

FIG. 1 is a partial, sectional elevational view of the preferred embodiment of the apparatus of the present invention;

FIG. 8 is a sectional view taken along lines 8—8 of FIG. 1; and

FIG. 9 is a sectional view taken along lines 9—9 of FIG. 1.

DETAILED DESCRIPTION OF THE INVENTION

Figures 2, 7:
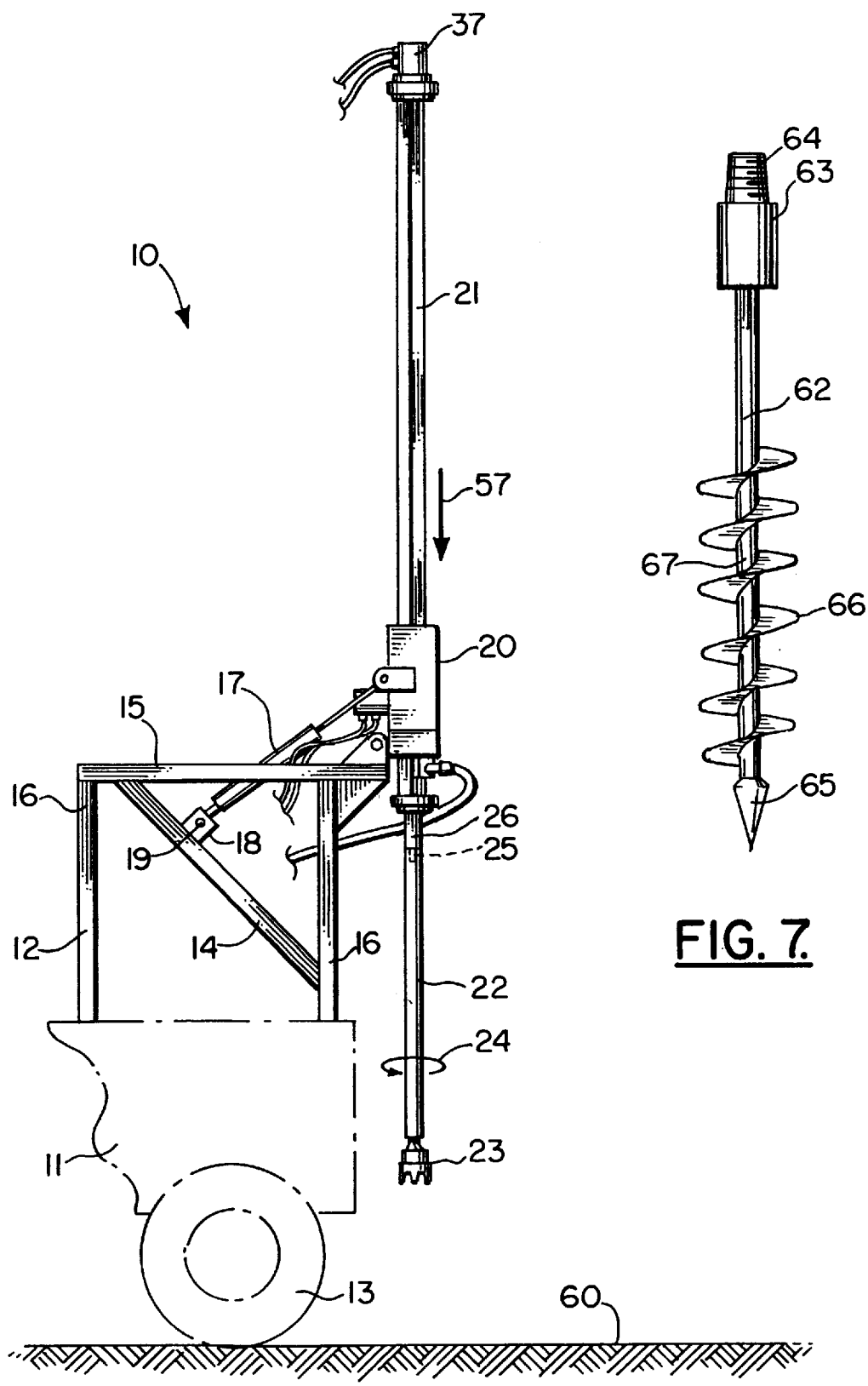
FIG. 2 is an elevational view of the preferred embodiment of the apparatus of the present invention illustrating operating position prior to drilling.
FIG. 7 is a partial view of the preferred embodiment of the apparatus of the present invention.

FIGS. 1 and 2–6 show the preferred embodiment of the apparatus of the present invention designated generally by the number 10 in FIG. 2–6.

Drilling apparatus 10 provides a mobile vehicle chassis 11 with a superstructure 12 mounted thereon. The vehicle chassis 11 can be for example a truck having wheels 13, an amphibious marsh craft, boat or other such mobile carrier.

Superstructure 12 includes a plurality of diagonal members 14, horizontal members 15, vertical members 16 that can be of structural steel, welded together to form the superstructure 12.

An extensible hydraulic cylinder 17 is extendable and retractable during raising and lowering of linear drive 20 and more particularly its elongated housing 21. A gusset 18 defines a pivot 19 for hydraulic cylinder 17 at superstructure 12. Similarly, the hydraulic cylinder 17 would be pivotally attached to housing 20.

Figures 5, 6:
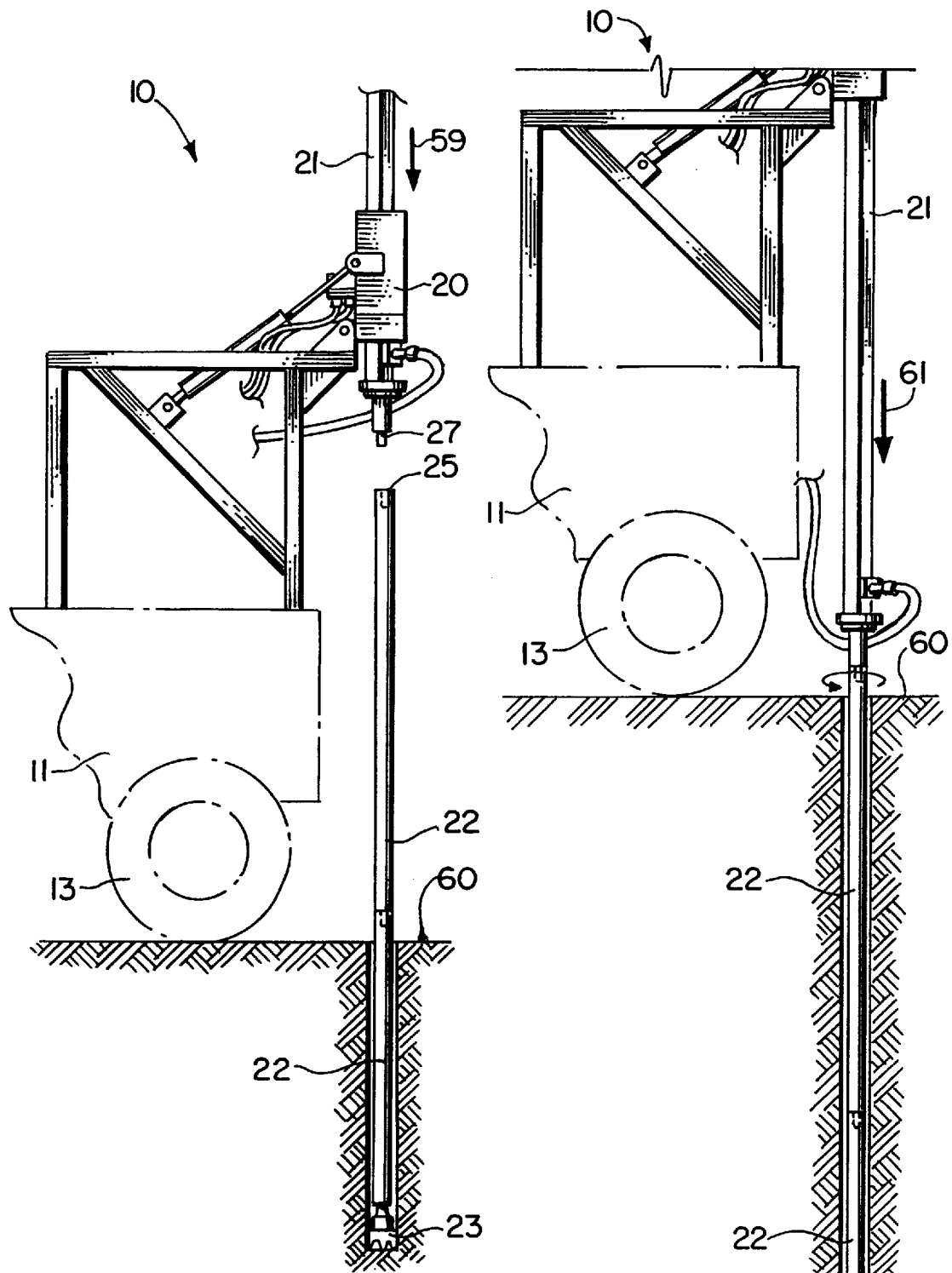
FIG. 5 is an elevational view of the preferred embodiment of the apparatus of the present invention illustrating the addiction of a second length of drill pipe.
FIG. 6 is an elevational view of the preferred embodiment of the apparatus of the present invention illustrating drilling with multiple lengths of drill pipe.

The apparatus 10 of the present invention can be connected to a plurality of sections of drill pipe 22 connected end-to-end as shown in FIG. 5 and 6 to form a drill string. In FIG. 2, a single section of drill pipe 22 has been connected to the apparatus 10, the first drill pipe section 22 having a drill bit 23. Curved arrow 24 indicates rotation of the drill pipe section 22 during drilling operations.

The apparatus 10 of the present invention enables one drill pipe section 22 after another to be connected end-to-end to form a drill string during use. In FIG. 5, the apparatus 10 is shown disconnected at pin connection 27 and box connection 25 so that a second section 22 of drill pipe can be added to the first section of drill pipe 22 that is already embedded into the earth as shown in FIG. 5. In FIG. 6, the two sections of drill pipe 22 have been further thrust into the earth 16.

A tubular rotary drive 26 provides pin connection 27 for connecting to the top of a first section of drill pipe 22. Tubular drive 26 has an internal bore 28 through which water can flow during drilling activity. This water flow is indicated by arrows 34, 36 in FIG. 1. Water enters as shown by arrow 34 through bore 33 of fluid supply line 32 and into bore 28 via openings 31 in the top of tubular member 26.

The tubular rotary drive 26 is comprised of an outer wall section 29 and an inner wall section 30. The inner wall section 30 carries the plurality of openings 31 through which water enters bore 28 as shown in FIG. 1. Fitting 35 is provided for attaching water supply line 32 to housing 21.

The apparatus 10 of the present invention provides rotary power for rotating the tubular drive 26 and any connected sections of drill pipe 22. The rotary power is provided by motor drive 37 that is preferably a hydraulic motor supplied with hydraulic fluid through hydraulic hoses 38, 39. A connection is formed between motor drive 37 and housing 21 at upper fitting 40. Motor drive 37 can be attached to upper fitting 40 at bolted connections 41, for example. A coupling 42 is formed between hydraulic motor 37 and tubular drive 26. The coupling includes an upper section 43 and lower section 44. Bolted connections 45 can be used to secure the upper and lower sections 43, 44 together. Motor drive 37 has an elongated shaft 46 that is attached to upper section 43 with a key way and key 47 arrangement. The lower end of shaft 46 is internally threaded to accept a threaded bolt 48 and washer 49 assembly that holds upper section 43 of coupling 42 to shaft 46.

Coupling 42 has a lower end 50 that is attached by a welded or a threaded connection 51 to outer wall 29. At the lower end portion of elongated housing 21, there is provided lower fitting 52 that forms a water tight connection between the housing 21 and tubular member 26. Fitting 52 extends around and above packing 56. Fitting 52 forms a connection at threaded connection 53 with assembly nut 54. The assembly nut 54 and fitting 52 secure packing 56 annular shoulder 55 of fitting 52 extends about the upper end of packing element 56.

Figures 3, 4:
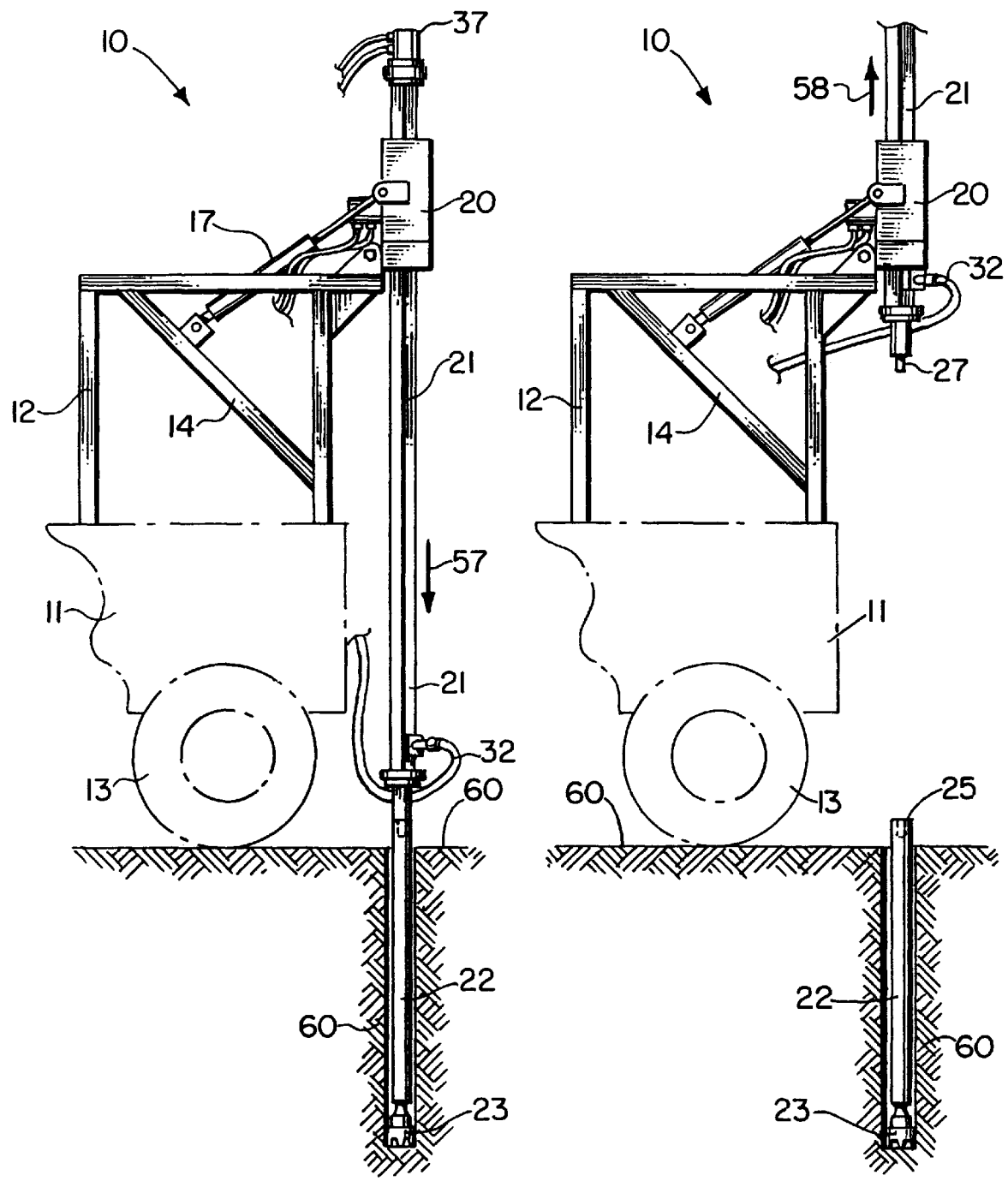
FIG. 3 is an elevational view of the preferred embodiment of the apparatus of the present invention shown during drilling.
FIG. 4 is a perspective view after installation of a single joint of drill pipe using the apparatus of the present invention.

Arrow 57 in FIG. 3 shows downward movement of the drill pipe sections 22 that are connected to rotary tubular drive 26 and housing 21. Linear drive 20 provides power for moving the elongated housing 21 and its connected sections of drill pipe 20 downwardly as shown by arrow 57.

In FIG. 4, arrow 58 shows upward movement of housing 21 relative to linear drive 20 such as when an additional link of drill pipe 22 is to be added to the drill string. In FIG. 4, the pin 27 connection of tubular drive 26 has been disconnected from the box 25 connection at the upper end of pipe section 22. The housing 21 has been lifted to its uppermost position as shown by arrow 58 in FIG. 4. In FIG. 5, an additional length of drill pipe 22 has been connected to the already installed lower section of drill pipe 22. The user then connects the pin in box 27, 25 connections as shown in FIG. 5 and 6 and proceeds with downward movement of the housing 21 as indicated by the arrows 59 and 61 as indicated in FIGS. 5 and 6 respectively.

In FIG. 7, there is shown an auger type drill bit 62 that could be used with the apparatus 10 of the present invention. Drill bit 62 has an upper end 63, a connection 64 for forming a connection with a section of drill pipe or with rotary tubular drive 26 and a lower end 65. A continuous thread 66 on shank 67 can be used to aid in embedding 62 into the underlying earth 60.

FIGS. 10–14 show the construction of linear drive member 20 more particularly. The linear drive member 20 can be the drive member that is shown and described in prior co-pending patent application Ser. No. 08/820,121, filed Mar. 19, 1997. Another and preferred drive member 20 is shown in FIGS. 7–11.

In FIGS. 10–14 linear drive motor 20 includes a frame 151 that includes an upper plate 152, lower plate 153 and side wall 154. Upper opening 155 and upper plate 152 allows elongated housing 124 to pass through frame 151 as shown in FIG. 7. Lower opening 156 in lower plate 153 likewise enables elongated housing 21 to pass through frame 151. Frame 151 provides an interior that carries a plurality of rollers. In FIGS. 10–14, upper support rollers 57 engage elongated housing 21 at opening 155. Lower support rollers 158 likewise support elongated housing 21 at opening 156. Each of the plurality of rollers 157, 158 is mounted upon a support 159 as shown in FIGS. 9–10 and 12–13. Transverse plate 165 extends across housing 151, carrying a plurality of roller supports 159. In FIGS. 9 and 10–13, upper and lower plates 165 are provided for respectively supporting upper and lower pluralities of support rollers 157, 158. Each of the roller supports 159 can be bolted to the respective plate 165 using bolts 166 for example.

Motor drive 160 can be a hydraulic motor, powered by pressurized hydraulic fluid conveyed to motor drive 160 with hydraulic flow lines 161, 162. Motor drive 160 provides drive shaft 163 and drive gear 164 that rotates with shaft 163.

Figure 10:
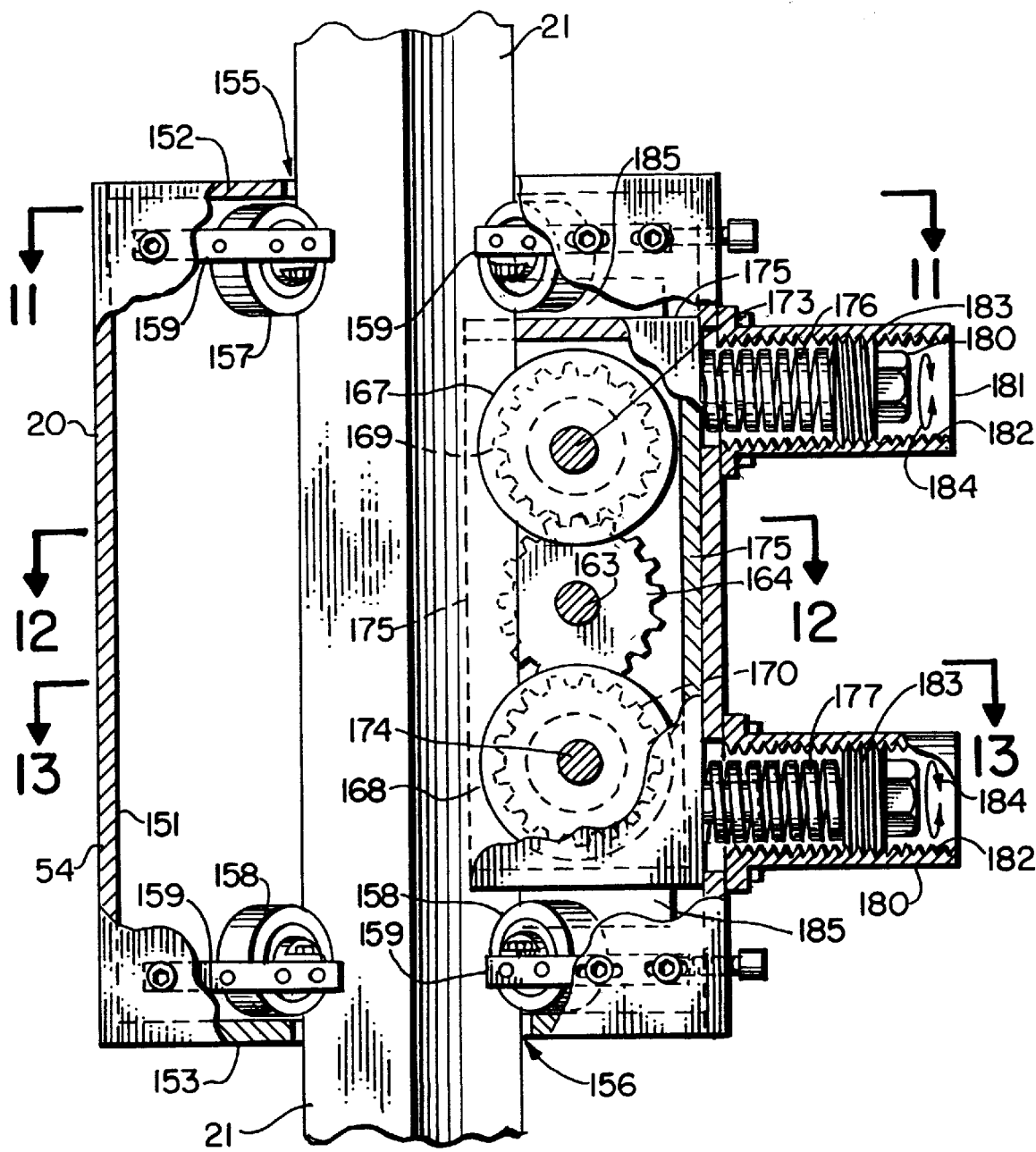
FIG. 10 is a partial view of the preferred embodiment of the apparatus of the present invention showing the drive portion thereof in sectional elevational view to illustrate engagement of the longitudinally extending housing by idler wheels and drive wheels of the drive.
Figure 11:
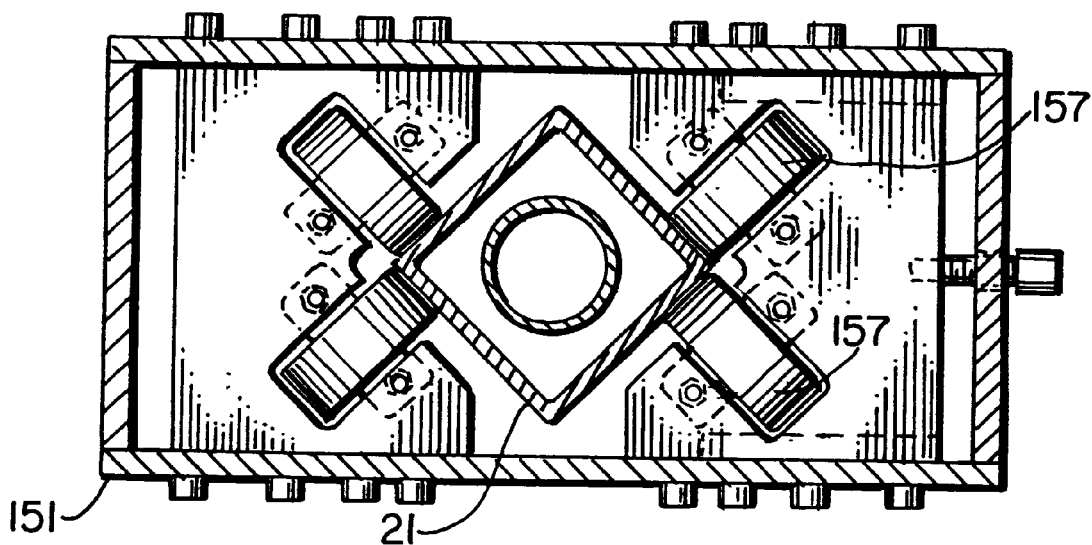
FIG. 11 is a sectional view taken along lines 11—11 of FIG. 10.
Figure 12:
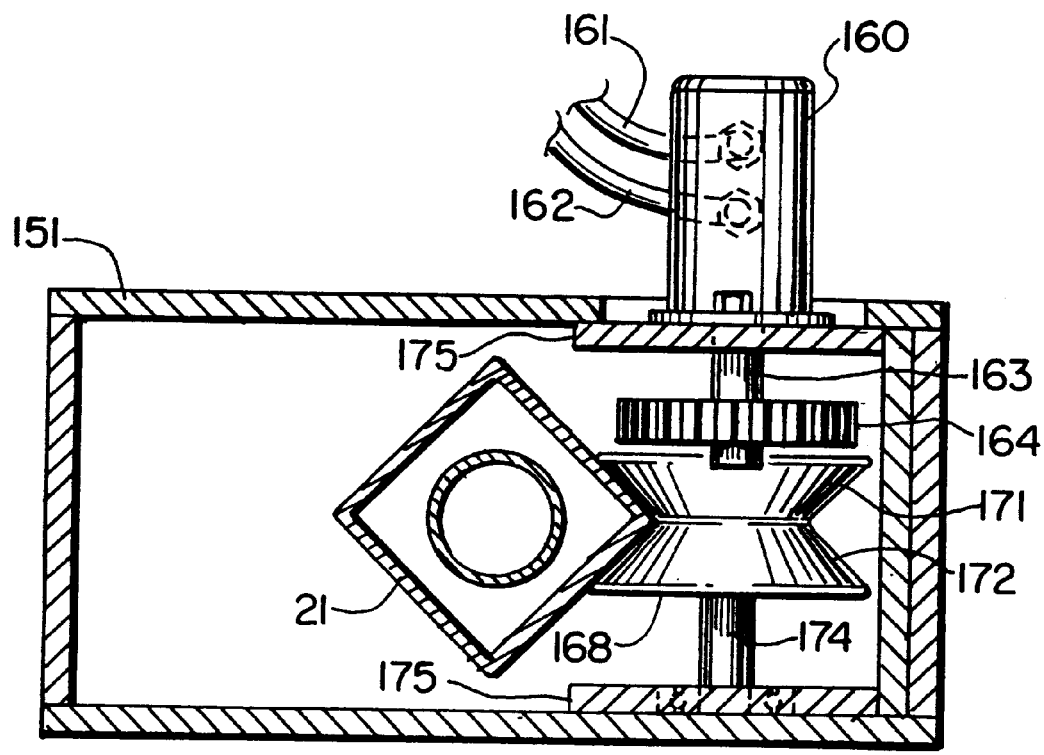
FIG. 12 is a sectional view taken along lines 12—12 of FIG. 10.
Figure 13:
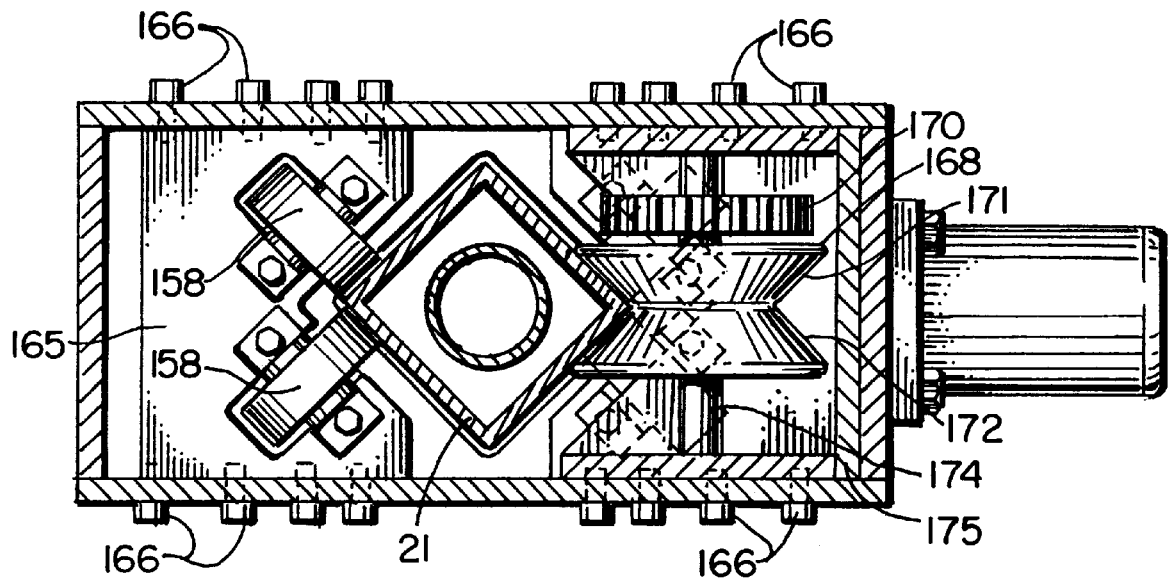
FIG. 13 is a section view taken along lines 13—13 of FIG. 10.
Figure 14:
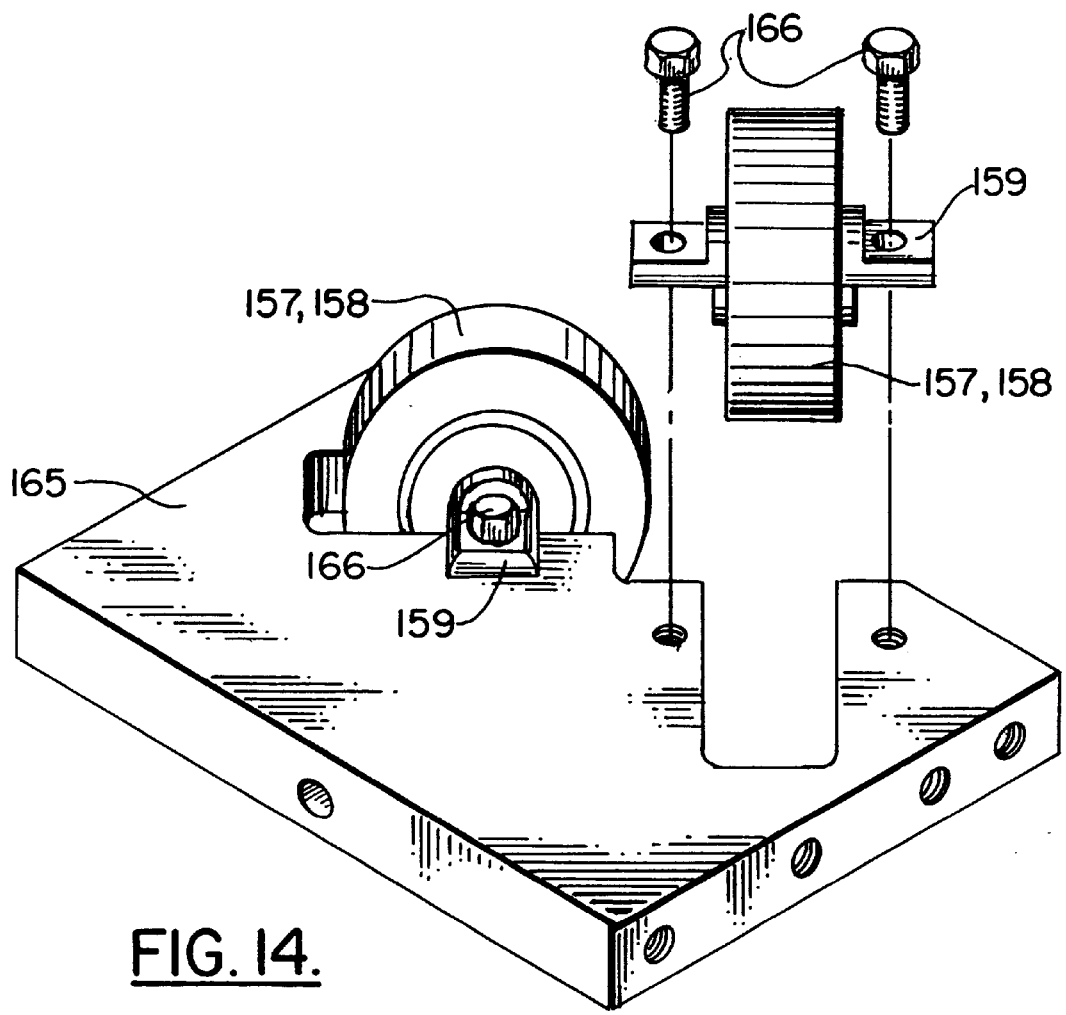
FIG. 14 is a perspective fragmentary view illustrating the idler wheel portions of the preferred embodiment of the apparatus of the present invention.

In FIG. 10, sheaves or wheels 167, 168 are positioned above and below drive gear 164. The upper sheave 167 is driven by and rotates with upper gear 169. Lower sheave 168 is driven by and rotates with lower gear 170. Each of the sheaves 167, 168 provides a pair of opposed frustoconical surfaces 171, 172 as shown in FIG. 12 for engaging elongated housing 21. The upper sheave 167 is supported by upper shaft 173. Lower sheave 168 is supported by lower shaft 174. Within the confines of frame 151, gear housing 175 can be provided for protectively covering the gears 164, 169, 170. Gear housing 175 slides within frame 120 upon guide blocks 185.

Pressure is applied to the sheaves 167, 168 with respective upper and lower springs, or pushers 176, 177 that engage hear housing 175. An upper spring carrier 178 carries upper spring 176. A lower spring carrier 179 carries lower spring 177 as shown in FIG. 10. Each of the springs 176, 177 is adjustable to vary the compression applied to gear housing and then to each sheave 167 or 168 to thus increase or decrease the frictional engagement between a sheave 167 or 168 and the elongated housing 21. In FIG. 10, adjustment nuts 180 provide external threads 183 that engage the internal threads 182 of spring carriers 178, 179. Thus, each of the spring carries 178, 179 provides and internally cylindrically shaped socket 181 for carrying an adjustment nut 180. In FIG. 10, arrows 184 indicate the rotary movement of a selected nut 180 in order to adjust the springs 176, 177 during use.

The following table lists the parts numbers and parts descriptions as used herein and in the drawings attached hereto.

| PARTS LIST | |
|---|---|
| Part Number | Description |
| 10 | drilling apparatus |
| 11 | vehicle chassis |
| 12 | superstructure |
| 13 | wheel |
| 14 | diagonal member |
| 15 | horizontal member |
| 16 | vertical member |
| 17 | hydraulic cylinder |
| 18 | gusset |
| 19 | pivot |
| 20 | linear drive |
| 21 | elongated housing |
| 22 | drill pipe |
| 23 | drill bit |
| 24 | curved arrow |
| 25 | box connection |
| 26 | rotary drive |
| 27 | pin connection |
| 28 | bore |
| 29 | outer wall section |
| 30 | inner wall section |
| 31 | opening |
| 32 | fluid supply line |
| 33 | bore |
| 34 | arrow |
| 35 | fitting |
| 36 | arrow |
| 37 | motor drive |
| 38 | hydraulic hose |
| 39 | hydraulic hose |
| 40 | upper fitting |
| 41 | bolt |
| 42 | coupling |
| 43 | upper section |
| 44 | lower section |
| 45 | bolt |
| 46 | shaft |
| 47 | key |
| 48 | threaded bolt |
| 49 | washer |
| 50 | lower end |
| 51 | connection |
| 52 | lower fitting |
| 53 | threaded connection |
| 54 | nut |
| 55 | packing element |
| 56 | packing |
| 57 | arrow |
| 58 | arrow |
| 59 | arrow |
| 60 | earth |
| 61 | arrow |
| 62 | anchor |
| 63 | upper end |
| 64 | connection |
| 65 | lower end |
| 66 | continuous thread |
| 67 | shank |
| 151 | frame |
| 152 | upper plate |
| 153 | lower plate |
| 154 | sidewall |

-continued

PARTS LIST

| Part Number | Description |
| --- | --- |
| 155 | upper opening |
| 156 | lower opening |
| 157 | upper support roller |
| 158 | lower support roller |
| 159 | wheel support |
| 160 | motor drive |
| 161 | hydraulic flow line |
| 162 | hydraulic flow line |
| 163 | drive shaft |
| 164 | drive gear |
| 165 | transverse plate |
| 166 | bolt |
| 167 | upper sheave |
| 168 | lower sheave |
| 169 | upper gear |
| 170 | lower gear |
| 171 | frustoconical surface |
| 172 | frustoconical surface |
| 173 | upper shaft |
| 174 | lower shaft |
| 175 | gear housing |
| 176 | upper spring |
| 177 | lower spring |
| 178 | upper spring carrier |
| 179 | lower spring carrier |
| 180 | adjustment nut |
| 181 | cylindrical socket |
| 182 | internal thread |
| 183 | external thread |
| 184 | curved arrow |
| 185 | guide |
| 186 | planetary gear box |

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A mobile drilling forming boreholes into the earth, comprising:
    a) a mobile carrier having a chassis and a machine frame that supports a drive;
    b) an elongated housing having a longitudinal housing bore, the housing supported by the drive and machine frame for movement with respect to the frame into at least a generally vertical position;
    c) elongated drill pipe member carried within the housing bore and dimensioned to reach near the earth's surface or to a selected subterranean earth layer, the drill pipe member having upper and lower ends, a pipe bore, and an upper end with pipe openings;
    d) a detachable connection positioned at the lower end of the drill pipe member;
    e) the drive including a plurality of wheels carried by the frame for transporting the housing between upper and lower positions, including at least some wheels that frictionally grip the housing outer surface;
    f) a gear train for interconnecting and driving some of the wheels so that multiple of the wheels rotate at the same rotational speed;
    g) the drive further including a pusher that applies lateral pressure to at least one of the wheels; and
    h) a water supply conduit for transmitting water into the housing and pipe to the pipe openings, through the pipe bore and to a supported drill pipe section.

2. The apparatus of claim 1 wherein there are two driven rollers.

3. The apparatus of claim 1 wherein there are a plurality of opposed rollers on opposing sides of the elongated housing.

4. The apparatus of claim 3 wherein the gear train includes a drive gear, an upper gear, and a lower gear.

5. The apparatus of claim 4 wherein the gear train includes a middle gear driven by a motor drive and wherein the middle gear drives the upper and the lower gear.

6. The apparatus of claim 1 wherein some of the drive rollers have annular grooves that conform generally to the outer surface of the elongated housing.

7. The apparatus of claim 1 further comprising a motor drive carried at the upper end of the elongated housing for rotating the drill pipe member.

8. The apparatus of claim 1 wherein the wheels include first and second pluralities of idler wheels positioned at spaced apart elevational positions.

9. The apparatus of claim 8 wherein the upper idler wheels are on opposite sides of the housing.

10. A water fed drilling apparatus for forming boreholes in the earth, comprising:
    a) a mobile carrier having a chassis with a machine frame, the frame including a drive;
    b) an elongated housing having an upper end, a lower end, and a smooth uninterrupted outer surface, the housing movably supported by the frame and drive between generally horizontal and generally vertical positions;
    c) a tubular pipe drilling member contained within the housing for rotating multiple connected sections of drill pipe supported below the lower end of the housing, the drilling member having a pipe bore and pipe openings;
    d) a plurality of drive wheels carried by the frame for transporting the housing between upper and lower positions, including at least a pair of opposed wheels for frictionally gripping the smooth uninterrupted housing outer surface;
    e) each drive wheel having a smooth annular groove that is generally shaped in transverse cross section to closely conform to the housing outer surface;
    f) a gear train for interconnecting and driving the plurality of wheels so that a plurality of the wheels rotate at the same rotational speed;
    g) the drive further including a pusher that applies lateral pressure to at least one of the wheels, the pusher being adjustable so that lateral pressure applied by the wheels to the housing being varied; and
    h) a water supply conduit for transmitting water into the housing, to the pipe openings, through the pipe bore and to a supported drill pipe section.

11. An apparatus for placing an auger type anchor into the earth, comprising:
    a) a mobile carrier having a chassis with a machine frame that supports a drive assembly;
    b) an elongated housing carried by the drive assembly and movable, the housing having an upper and a lower end;
    c) a drill pipe member supported at the lower end of the housing;
    d) a plurality of wheels carried by the frame for and drive assembly transporting the housing between upper and lower positions, said wheels including at least a pair of opposed wheels for frictionally gripping the housing outer surface;
    e) a gear train for interconnecting and driving the plurality of wheels so that all of the wheels rotate at the same rotational speed;

f) the drive assembly including a pusher that applies lateral pressure to at least one of the wheels;

g) wherein the drill pipe member includes a disconnectable connection for connecting to a section of drill pipe;

h) a motor drive for rotating the drill pipe section during drilling; and i) a water conduit that enables water to be supplied to the drill pipe section via the housing and drill pipe member.

12. The apparatus of claim 11 wherein there are two pairs of opposed rollers.

13. The apparatus of claim 12 wherein the two pluralities of opposed rollers include an upper plurality of rollers and a plurality of drive rollers.

14. The apparatus of claim 13 wherein the rollers have grooves that conform generally to the outer surface of the housing.

15. The apparatus of claim 13 wherein the gear train comprises a plurality of gears.

16. The apparatus of claim 15 wherein the gears include upper and lower gears connected for rotation to an intermediate gear.

17. The apparatus of claim 15 wherein the intermediate gear is powered by the motor drive.

18. The apparatus of claim 11 wherein the anchor holder includes an elongated member supported by the housing.

19. The apparatus of claim 18 wherein the housing has a bore that contains the elongated member.

20. The apparatus of claim 19 wherein the elongated member is driven by a motor supported at the upper end of the housing.

21. A mobile drilling apparatus for drilling boreholes into the earth, comprising:

a) a mobile vehicle;

b) a machine frame carried on the vehicle, said frame supporting a drive assembly;

c) the drive assembly supporting an elongated housing having an upper and a lower end, the housing having a hollow longitudinally extending housing bore;

d) a tubular member rotatably mounted within the housing bore, the tubular member including a drill pipe section holder positioned at the lower end of the housing;

e) a plurality of wheels carried by the drive assembly for transporting the housing between upper and lower positions, the drive assembly including at least a pair of opposed wheels for frictionally gripping the housing;

e) a gear train for interconnecting and driving some of the wheels so that they rotate at the same rotational speed;

f) the drive assembly including a pusher that applies lateral pressure to at least one of the wheels of the pair of opposed wheels to grip the housing;

g) wherein the drill pipe section holder includes an anchor connecting portion that enables an anchor to be affixed to the tubular member and disconnected therefrom once the anchor is placed; and h) a conduit that supplies water to the drill pipe section via the housing and tubular member.

* * * * *